United States Patent [19]

Frey et al.

[11] Patent Number: 4,889,175

[45] Date of Patent: Dec. 26, 1989

[54] TORQUE WINDOW

[75] Inventors: Robert A. Frey, Elkhart, Ind.; Gail E. Woods, Sturgis, Mich.; Leroy C. Schmuck, Kendallville, Ind.

[73] Assignee: Excel Industries, Inc., Elkhart, Ind.

[21] Appl. No.: 171,825

[22] Filed: Mar. 22, 1988

[51] Int. Cl.$^4$ .............................................. E06B 3/32
[52] U.S. Cl. ........................................ 160/90; 49/341
[58] Field of Search ...................... 160/90, 89, 92, 91; 49/341, 340, 345, 83, 85; 52/207

[56] References Cited

U.S. PATENT DOCUMENTS

| | | | |
|---|---|---|---|
| 2,383,912 | 8/1945 | Gargiulo | 49/85 X |
| 2,422,704 | 6/1947 | Russell et al. | 160/92 |
| 2,556,407 | 6/1951 | Wilke | 160/92 X |
| 2,622,672 | 12/1952 | Thomas | 160/92 X |
| 2,678,478 | 5/1954 | Peremi | 160/92 X |
| 2,809,727 | 10/1957 | Ware | 49/85 X |
| 3,111,725 | 11/1963 | Brown | 52/207 |
| 3,460,289 | 8/1969 | Toth | 49/85 X |
| 3,934,370 | 1/1976 | Kwan et al. | 49/345 X |

Primary Examiner—Alvin C. Chin-Shue
Assistant Examiner—David M. Purol
Attorney, Agent, or Firm—James D. Hall; Thomas J. Dodd; Todd A. Dawson

[57] ABSTRACT

A vehicle window assembly which includes first and second separate window glazing panels. The first window is fixed while the second may be pivoted between open and closed positions by a hand crank connected to a peripheral linkage system by a shaft, with the linkage connected to the second window. The hand crank is located at the center of the shaft and the shaft includes stop means for preventing overturning of the hand crank past the full open position of the window.

7 Claims, 6 Drawing Sheets

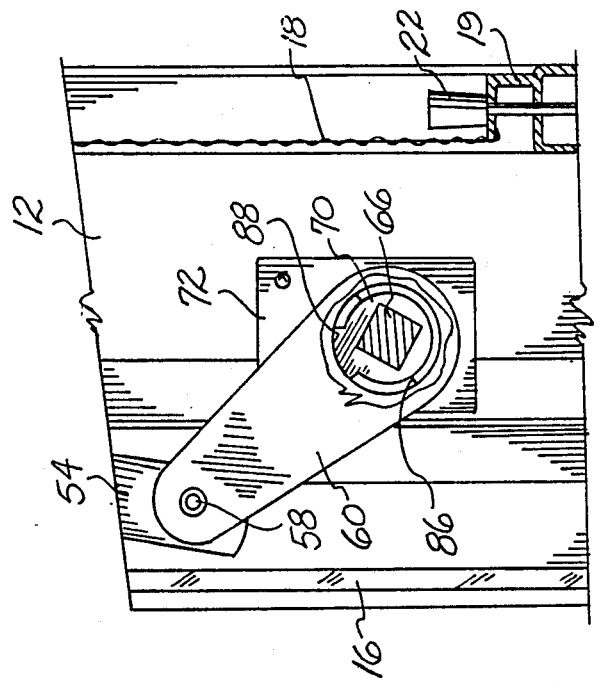
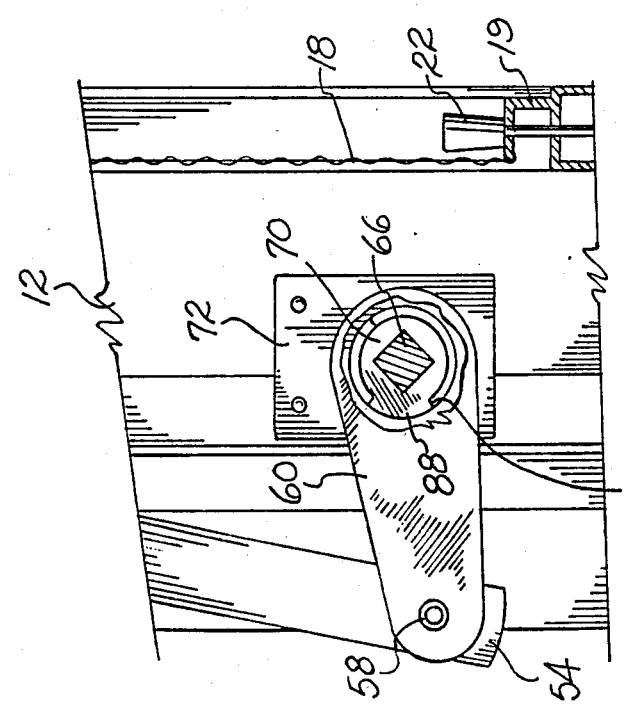

TORQUE WINDOW

SUMMARY OF THE INVENTION

This invention relates to an improved window and will have application to a vent-type hinged vehicle window.

Previously, windows in busses and other large vehicles, such as Class A motor homes and trailers, were either of the fixed stationary variety or included slide tracks to allow the window to be opened. Due to the typically large size of such windows, opening by use of slide tracks often proved difficult and cumbersome.

The torque window of this invention includes a centrally mounted turnable knob for opening the window in a vent-type manner by pivoting the window along a horizontal axis. The knob is connected to side located links by a common horizontal shaft which are concealed in the window frame to provide for a more pleasing overall appearance. The window frame may also accommodate a removable or permanent screen.

Accordingly, it is an object of this invention to provide for an improved vehicle window assembly.

Another object of this invention is to provide for a vent-type vehicle window which is operated by a centrally positioned turnable knob.

Another object of this invention is to provide for a vehicle window assembly which is easy to open and close regardless of its size.

Another object of this invention is to provide for a vehicle window assembly which is efficient and economical.

Other objects of this invention will become apparent upon a reading of the following description.

BRIEF DESCRIPTION OF THE DRAWINGS

A preferred embodiment of the invention has been depicted for illustrative purposes wherein:

FIG. 6 is a fragmentary perspective view of one corner of the window illustrating the limiting sleeve and bushing with the linkage in the open position.

FIG. 7 is a view similar to FIG. 6 showing the linkage in its closed position.

DESCRIPTION OF THE PREFERRED EMBODIMENT

Figure 1:
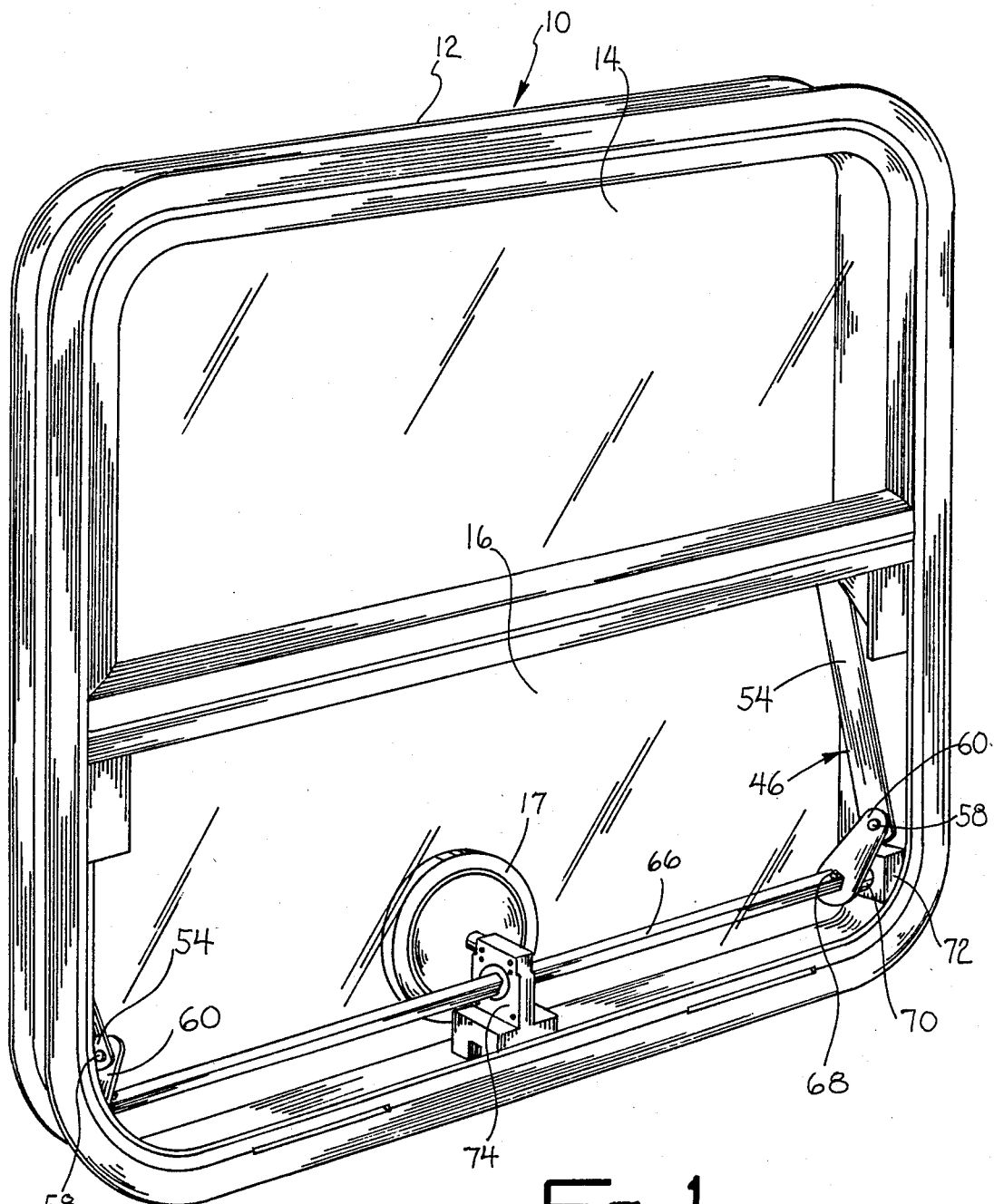
FIG. 1 is a perspective view of the torque window assembly taken from outside.

The preferred embodiment herein described is not intended to be exhaustive or to limit the invention to the precise form disclosed. It is chosen and described to explain the principles of the invention and its application and practical use so that others skilled in the art may utilize the invention.

Referring now to the drawings, reference numeral 10 refers generally to the torque window assembly of this invention. Window assembly 10 is generally adapted for use in motor vehicles or trailers and is particularly suited for use as a side window in busses and Class A motor homes.

Figure 3:
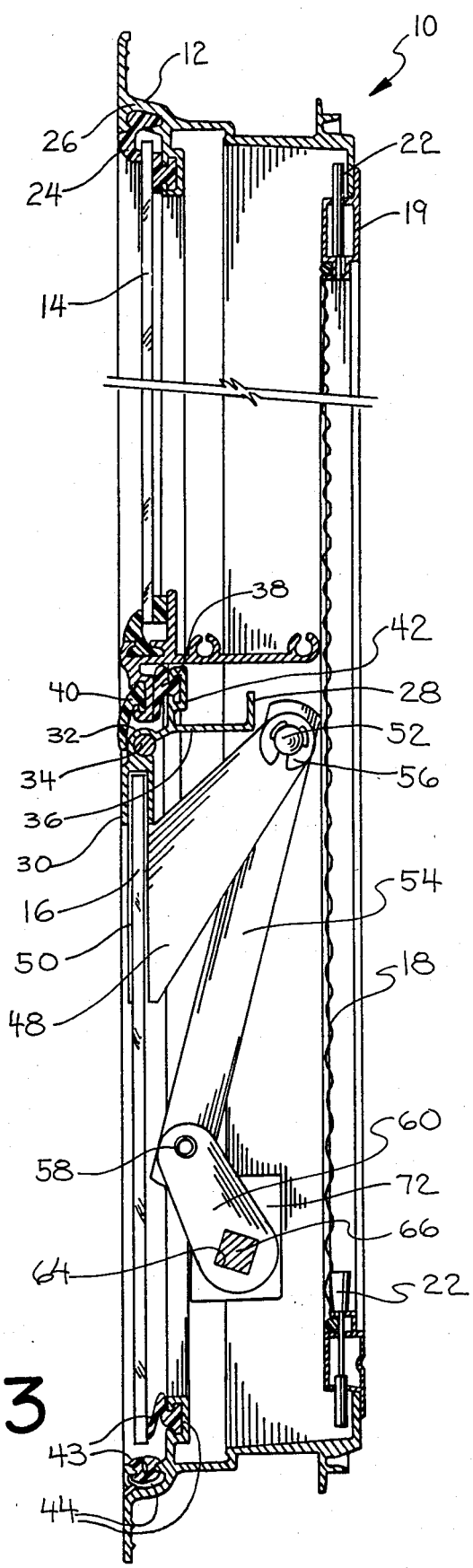
FIG. 3 is a vertical sectional view taken along line 3—3 of FIG. 2.
Figure 4:
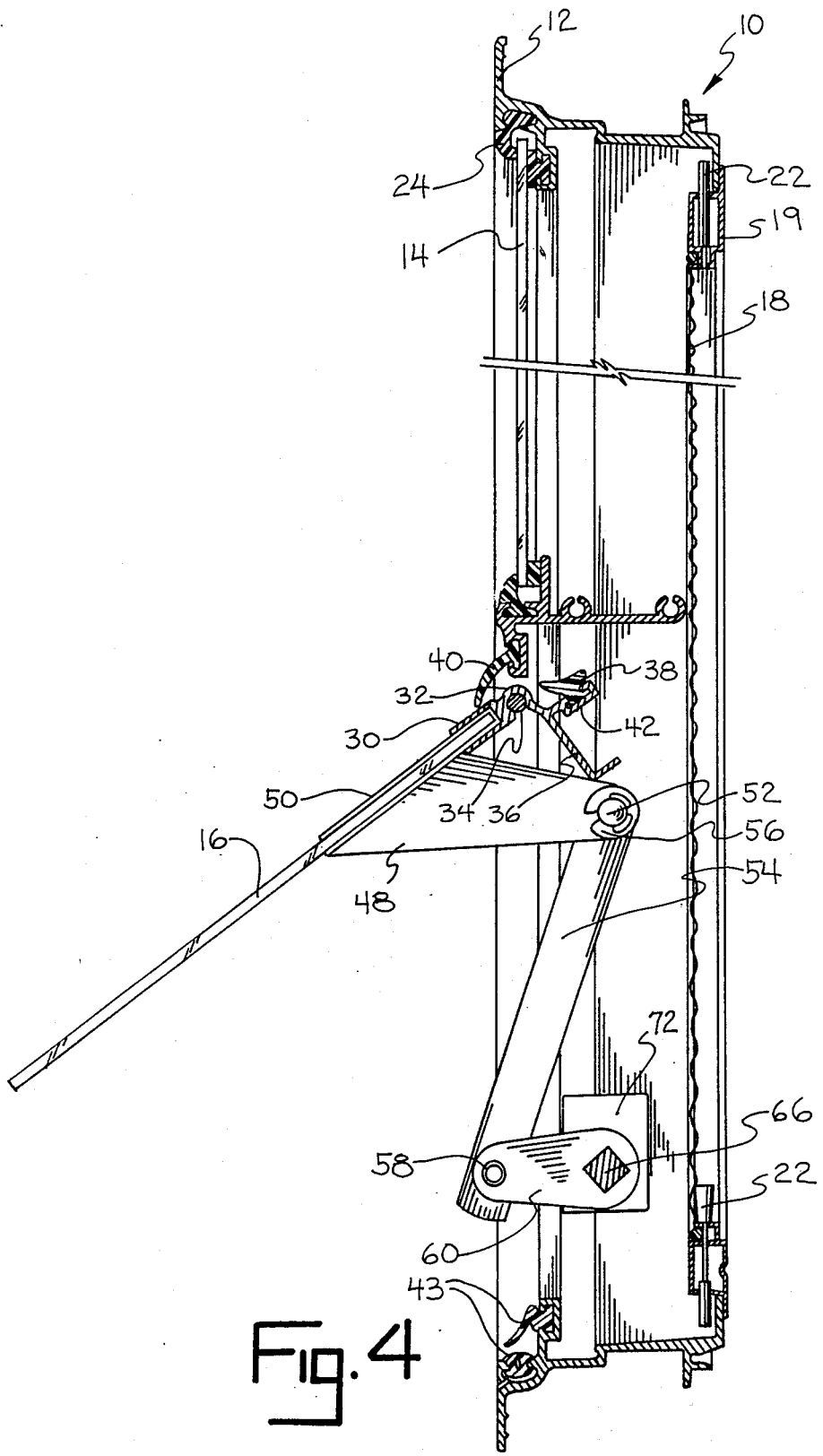
FIG. 4 is a vertical sectional view similar to FIG. 3, but showing the window pivoted into an open position.
Figure 5:
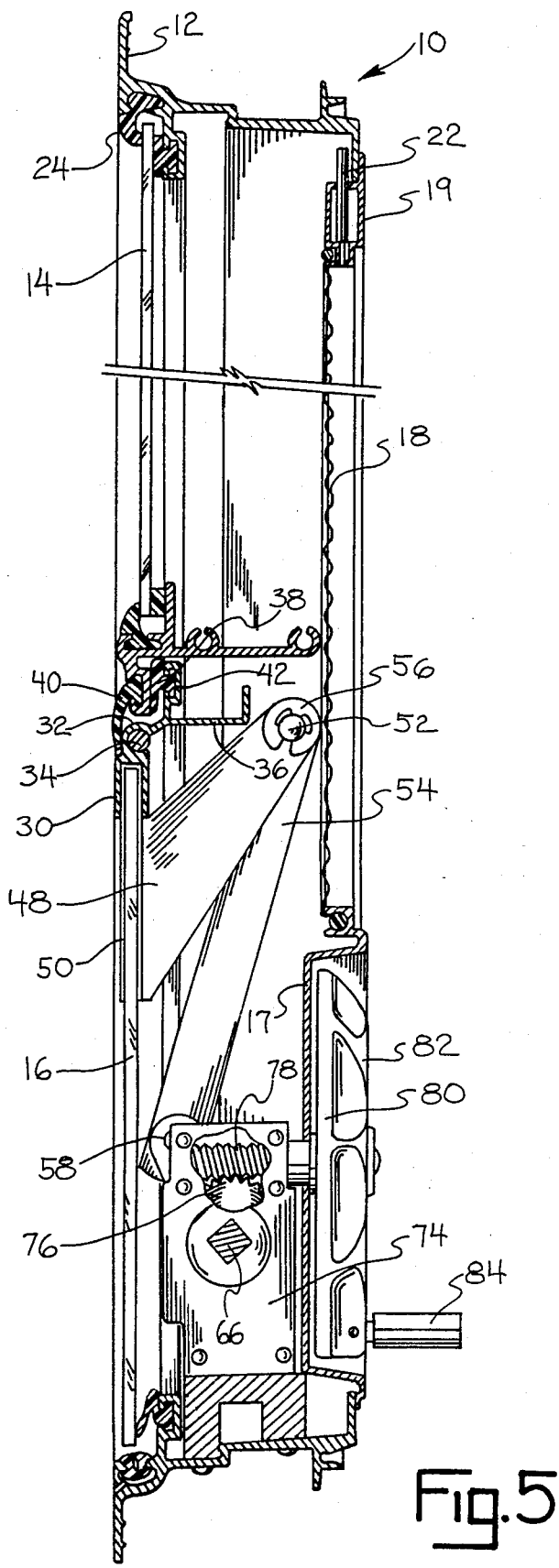
FIG. 5 is a vertical sectional view taken along line 5—5 of FIG. 2.

Window assembly 10 includes a peripheral window frame 12 which encloses a pair of glazing panels 14 and 16. In the preferred embodiment, glazing panel 14 will be referred to as the stationary glazing panel, while glazing panel 16 will be referred to as the pivotable panel. It is understood that the principles of this invention could apply equally to a torque window assembly in which either or both of the glazing panels 14, 16 are pivotable as described below. A screen 18 which includes a peripheral frame 19 may be secured to frame 12 by fasteners 22 as shown in FIGS. 3-5. Screen 18 also includes a lower inset frame part 17 which is preferably round and situated near the bottom center of the screen.

Glazing panel 14, shown in the drawings as the upper panel, is secured to frame 12 by a peripheral seal 24. Seal 24 is formed of commercially known materials, such as polyurethane or the like, and is fitted restrictively within a peripheral channel part 26 of frame 12. Glazing panel 14 is secured within and held in place by seal 24 which may be affixed in channel part 26 as by gluing to firmly secure the glazing panel in a stationary orientation.

Lower glazing panel 16 is secured to a one-piece integral pivotal mesh 28. Sash 28 includes a channel part 30 in which glazing panel 16 is restrictively fitted. Sash 28 also includes a curved hinge part 32 which extends over horizontal rod 34 connected to frame 12. A flange 36 extends from hinge part 32 and carries a molded seal 38. Molded seal 40 fits in frame channel part 42 across the top of glazing panel 16 and contacts sash 28 to seal against the elements. Seals 43 are fitted in frame channel parts 44 beneath glazing panel 16 about the sides and bottom to create a complete seal.

Associated with glazing panel 16 is a linkage system 46 positioned adjacent each side edge of frame 12. Each linkage 46 includes a link 48 connected to glazing panel 16 as by a conventional adhesive sealant 50 and to a hinge pin 52 which is connected to frame 12. A link 54 is connected between hinge pin 52 by a lock ring 56, which allows for correlative movement of links 48 and 54, and a hinge pin 58. A link 60 is connected to hinge pin 58 which allows for correlative pivoting movement of links 54 and 60. The other end of link 60 has a square bore 64. A square shaft 66 extends through each link 60 and is secured by a lock pin 68. Each end of shaft 66 is journalled in a cylindrical bushing 70 having a protruding stop part 88 which is rotatably positioned in support 72 secured to frame 12.

Positioned adjacent the inner lower edge of frame 12 equidistantly from each linkage system 46 is a gear box 74. Shaft 66 extends through a worm gear 76 for correlative rotation therewith. Worm gear 76 mates with worm screw 78 which extends outwardly of gear box 74 through screw frame part 17. A crank 80 is rotatively fitted in screen frame part 17 with worm screw 78 secured to the crank in a conventional manner. Crank 80 is preferably round and may include peripheral finger projections 82 and a handle 84 to allow the crank to be turned in one of two fashions.

Support 72 preferably includes a notch terminating in shoulder 86 as shown in FIGS. 6 and 7 to provide a stop when the window is in its open position (See FIG. 7).

Figure 2:
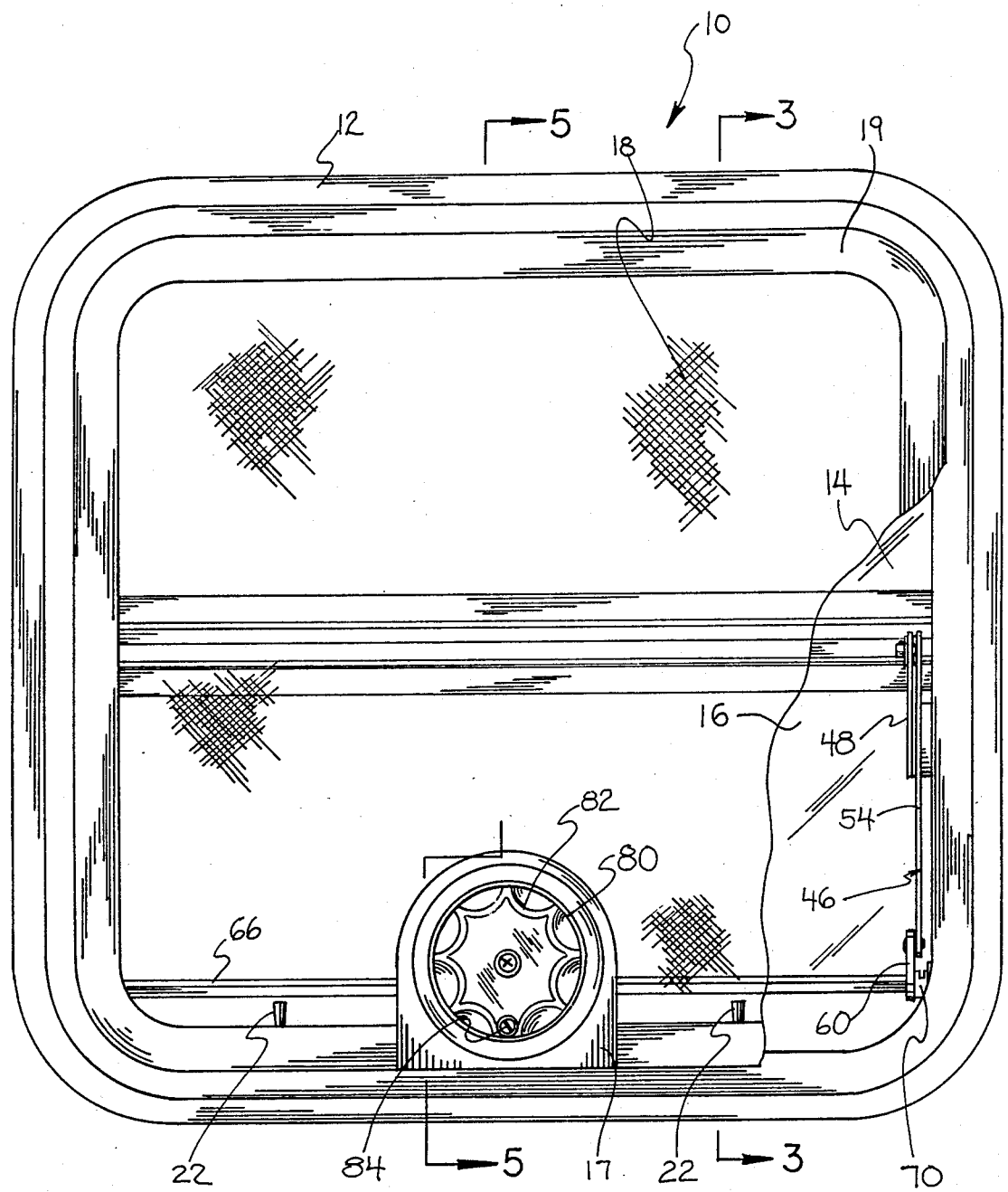
FIG. 2 is an elevation view of the inside of the window.

Window assembly 10 operates as follows. With the window in the closed position of FIGS. 1, 2 and 3, a user turns crank 80 in the appropriate direction (clockwise as shown in the drawings) by either finger projections 82 or handle 84. As crank 80 turns, worm screw 78 turns and engages worm gear 76 to effect rotation of the worm gear and its connected shaft 66. Rotation of shaft 66 causes link 60 to pivot outwardly and due to its pivotal connection to links 48 and 54, link 60 causes pivotal movement of links 48 and 54 to pivot glazing panel 16 and its sash 28 into the open position of FIG. 4. Support notch shoulder 86 and bushing stop part 88 prevent over-rotation of crank 80 when the window is fully open. To close the window assembly, the above process is repeated with crank 80 simply turned in the opposite direction to close the window.

It is understood that the above description is not intended to limit the scope of the invention to those exact details, but may be modified within the language of the following claims.

We claim:

1. In a vehicle window assembly including a peripheral frame which defines an opening, first and second window glazing panels carried by and supported in said frame and spanning said opening, said first glazing panel fixedly secured to said frame, said second glazing panel including peripheral side edges and pivotally secured to said frame for movement between a closed position adjacent said frame, and an open position with one edge spaced from said frame, and crank means for pivoting said second glazing panel between its open and closed positions, the improvement wherein said frame includes horizontal and vertical frame members, said crank means includes a hand crank positioned adjacent one of said horizontal members generally equidistantly spaced from said vertical frame members, link means connected between said hand crank and said second glazing panel peripheral side edges responsive to movement of said hand crank for pivoting the second glazing panel between its open and closed positions.

2. The vehicle window assembly of claim 1 wherein said link means includes a generally horizontal shaft operatively connected to said hand crank for rotation thereof upon rotation of the hand crank, said link means further including a plurality of links connected between said shaft and said second glazing panel.

3. The vehicle window assembly of claim 2 wherein said shaft is journalled in a support member positioned adjacent each vertical frame member, one of said support members including stop means for limiting rotation of said shaft and pivoting of said second glazing panel into the open position.

4. The vehicle window assembly of claim 3 wherein said shaft is circumscribed at one end of a bushing having a raised projection, said one support member defining a notch which accommodates said bushing projection, said bushing projection and notch constituting said stop means.

5. The vehicle window assembly of claim 1 wherein said hand crank includes a crank handle for effecting turning thereof, and further includes raised projections wherein the hand crank may be turned in the absence of said crank handle.

6. The vehicle window assembly of claim 2 and a screen including a screen frame detachably connected to said window frame, said shaft keyed to a worm gear adjacent said hand crank, said crank means including a worm screw mating with said worm gear to turn the worm gear and shaft, said worm screw extending through said screen frame and connected to said hand crank.

7. The vehicle window assembly of claim 6 wherein said screen frame includes an inset frame part for accommodating said hand crank, said worm screw extending through said inset frame part, said hand crank rotatively seated in said inset frame part.

* * * * *